(12) United States Patent
Kim

(10) Patent No.: US 11,393,298 B2
(45) Date of Patent: Jul. 19, 2022

(54) FINANCIAL TRANSACTION SYSTEM AND METHOD

(71) Applicant: Allink Co., Ltd., Seoul (KR)

(72) Inventor: Kyung Dong Kim, Seongnam-si (KR)

(73) Assignee: Allink Co., Ltd., Seoul (KR)

( * ) Notice: Subject to any disclaimer, the term of this patent is extended or adjusted under 35 U.S.C. 154(b) by 0 days.

(21) Appl. No.: 17/117,109

(22) Filed: Dec. 10, 2020

(65) Prior Publication Data

US 2021/0319672 A1    Oct. 14, 2021

(30) Foreign Application Priority Data

Apr. 8, 2020  (KR) .................. 10-2020-0042687

(51) Int. Cl.
  *G06Q 40/00*   (2012.01)
  *G07D 11/00*   (2019.01)
  *G07F 19/00*   (2006.01)

(52) U.S. Cl.
  CPC .......... *G07F 19/204* (2013.01); *G07F 19/203* (2013.01); *G07F 19/208* (2013.01); *G07F 19/209* (2013.01)

(58) Field of Classification Search
  CPC .......... G06Q 20/1085; G06Q 20/3223; G06Q 20/3274; G07F 19/20; G07F 19/203; G07F 19/204; G07F 19/208; G07F 19/209
  USPC ....................................... 235/379
  See application file for complete search history.

(56) References Cited

U.S. PATENT DOCUMENTS

| 8,065,226 B2 * | 11/2011 | Rizzo ................ G06Q 20/4014 705/39 |
| 2011/0238573 A1 | 9/2011 | Varadarajan |
| 2012/0160912 A1 * | 6/2012 | Laracey .................. G06F 21/43 235/379 |
| 2013/0175338 A1 * | 7/2013 | Block ................... G07F 19/205 235/379 |

(Continued)

FOREIGN PATENT DOCUMENTS

| KR | 10-2014-0111067 A | 9/2014 |
| KR | 10-2017-0035544 A | 3/2017 |

OTHER PUBLICATIONS

International Search Report in International Application No. PCT/KR2021/004441, dated Jul. 23, 2021, 3pages.

(Continued)

*Primary Examiner* — Tuyen K Vo
(74) *Attorney, Agent, or Firm* — Park, Kim & Suh, LLC (57) ABSTRACT

A financial transaction system includes a bank server, an authentication code transfer server, and an ATM. The bank server generates an authentication code in response to a request message received from a mobile terminal. Then the bank server transmits the authentication code to the mobile terminal. The authentication code transfer server receives the authentication code from the mobile terminal and forwards the authentication code to the ATM which then transmits the authentication code to the bank server for transaction authentication. The bank server performs transaction authentication by comparing the code received from the ATM with the code previously generated by the bank server. The ATM dispenses cash according to transaction information entered by a user using the mobile terminal upon receipt of a transaction approval message from the bank server.

16 Claims, 8 Drawing Sheets

(56) References Cited

U.S. PATENT DOCUMENTS

| | | | |
|---|---|---|---|
| 2017/0337782 A1* | 11/2017 | Nelson, Jr. | G07F 19/205 |
| 2018/0165663 A1 | 6/2018 | Naik et al. | |
| 2018/0300991 A1* | 10/2018 | Park | G06Q 20/3224 |
| 2019/0095912 A1* | 3/2019 | Park | G06Q 20/325 |
| 2020/0090166 A1 | 3/2020 | Tonini | |
| 2021/0027295 A1* | 1/2021 | Raquepaw | H04W 4/80 |
| 2021/0158315 A1* | 5/2021 | Phillips | H04W 12/068 |

OTHER PUBLICATIONS

How to withdraw Japan Post Bank ATM savings: 1000 yen bill limited exchange support, Japan, Dec. 13, 2019, <URL:https://web.archive.org/web/20191213011350/http://yubin.2-d.jp/c2/05.html>.

* cited by examiner

FINANCIAL TRANSACTION SYSTEM AND METHOD

CROSS-REFERENCE TO RELATED APPLICATIONS

A claim for priority under 35 U.S.C. § 119 is made to Korean Patent Application No. 10-2020-0042687 filed on Apr. 8, 2020, in the Korean Intellectual Property Office, the entire contents of which are hereby incorporated by reference.

BACKGROUND

Embodiments of the inventive concept described herein relate to a financial transaction method that enhances security and improves a user's convenience by entering transaction information and performing authentication using a user's mobile terminal, a transaction system using thereof.

Conventionally, most of the banking services that have been done by humans are being substituted by machines. In particular, in the banking services, financial transaction equipments represented by Automated Teller Machines (ATMs) have been installed not only in banks, but also in places with a large floating population and many users may conveniently deposit or withdraw cash or may conveniently make money transfers. Besides, financial transaction services using ATMs such as money transfers, payments of utility bills, and the like have been recently expanded beyond simple deposit and withdrawal services.

Nowadays, banks are trying to increase a user's convenience while reducing the manpower necessary to perform financial services, by automating more financial services using ATMs. Specifically, the user's convenience needs to be increased such that users utilize ATMs more frequently. However, increasing the user's convenience may weaken security functions due to the characteristics of financial transactions.

For example, many banks have recently provided services for withdrawing cash from ATMs with only the account number and password without a cash card or bankbook. In this case, the owner of an account is authenticated by using only the account number and password, and thus there may be a security concern. Accordingly, to prevent the leakage of an account number and password, caution notices saying such that "Enter numbers while covering your hand entering the numbers" are posted on ATM.

In the meantime, even in the case where cash is withdrawn using a cash card (ATM card), when anyone has the cash card and knows the password of the cash card, he/she may withdraw cash from the account or may perform a money transfer to another person's account, and thus there is a high security concern. In addition, the cash card is used for transactions in a so-called fake bankbook, which is an account opened in the name of another person, thereby increasing the risk of various pieces of financial transaction fraud.

Therefore, there is a need for a method of increasing the user's convenience while security is enhanced upon using financial transaction automation equipments.

SUMMARY

In an embodiment of the inventive concept, it is possible not only to enhance the security of financial transactions, but also to increase a user's convenience, by entering transaction information and performing authentication through a smartphone, instead of directly entering the transaction information into the financial transaction equipment.

According to an exemplary embodiment, a financial transaction system includes a bank server, an authentication code transfer server, and an ATM. The bank server receives an authentication request message from a mobile terminal, generates an authentication code in response to the request message, and transmits the authentication code to the mobile terminal. The authentication code transfer server then receives an authentication code transfer message from the mobile terminal where the authentication code transfer message includes the authentication code and transaction information entered by a user using the mobile terminal. The transaction information may include a withdrawal amount, an account number of a bank account subject to a cash withdrawal, and bill type information. The ATM receives a transaction request message including the authentication code and the transaction information from the authentication code transfer server, transmits an authentication request message including the authentication code to the bank server, and dispenses cash according to the transaction information received from the bank server. The bank server performs transaction authentication by comparing the authentication code received from the ATM and the authentication code previously generated by the bank server.

The financial transaction system may further include an ATM ID providing unit providing an ID of the ATM when the user tags the mobile terminal to the ATM ID providing unit and the ATM ID may be included in the authentication code transfer message received by the authentication code transfer server to identify the ATM. The authentication code transfer server may generate commands to be executed by the ATM when the authentication code transfer message is received from the mobile terminal. The ATM may execute the commands and display the transaction information on a screen for user confirmation.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
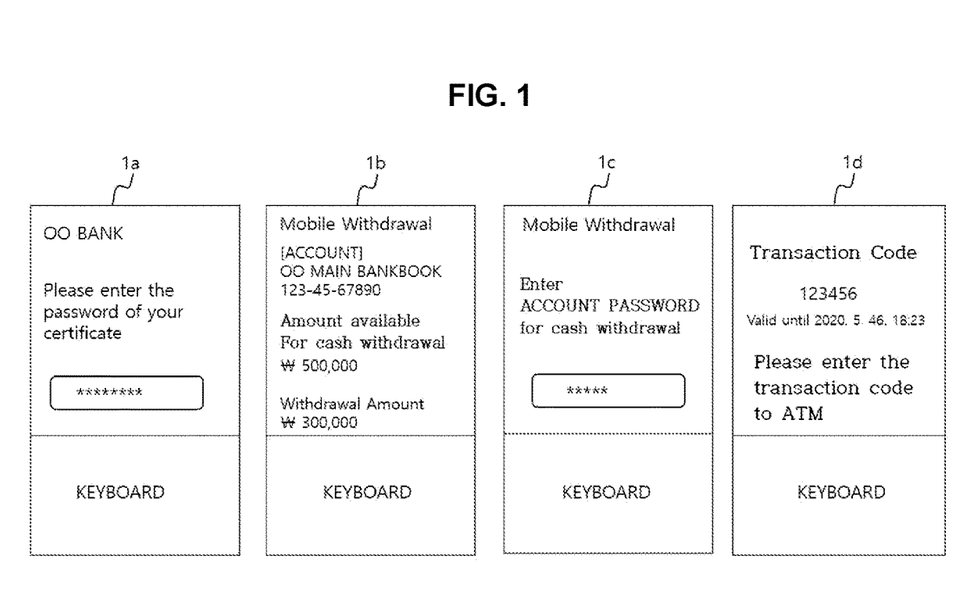
FIG. 1 illustrates a screen of a smartphone when a user withdraws cash from an ATM using the smartphone according to an embodiment of the present invention.

FIG. 1 illustrates a screen of a smartphone when a user withdraws cash from an ATM using the smartphone.

When a user runs a bank application installed in a smartphone 31 to withdraw cash using the user's smartphone 31, the smartphone 31 displays a window for user authentication. In the case of cash withdrawal or money transfer, the smartphone 31 may perform additional authentication through a digital certificate or a Personal Identification Number (PIN) (1*a*), in addition to the initial user authentication of the bank application.

When the authentication is completed, the user enters (or selects) transaction information for cash withdrawal such as an account number, withdrawal amount and bill type through the smartphone 31 (1*b*). In addition, it is possible for the user to enter an account password for cash withdrawal (1*c*) before or after the transaction information is entered.

After completion of the authentication, a transaction code for a cash withdrawal is displayed on the screen of the smartphone 31 (1*d*).

Figure 2:
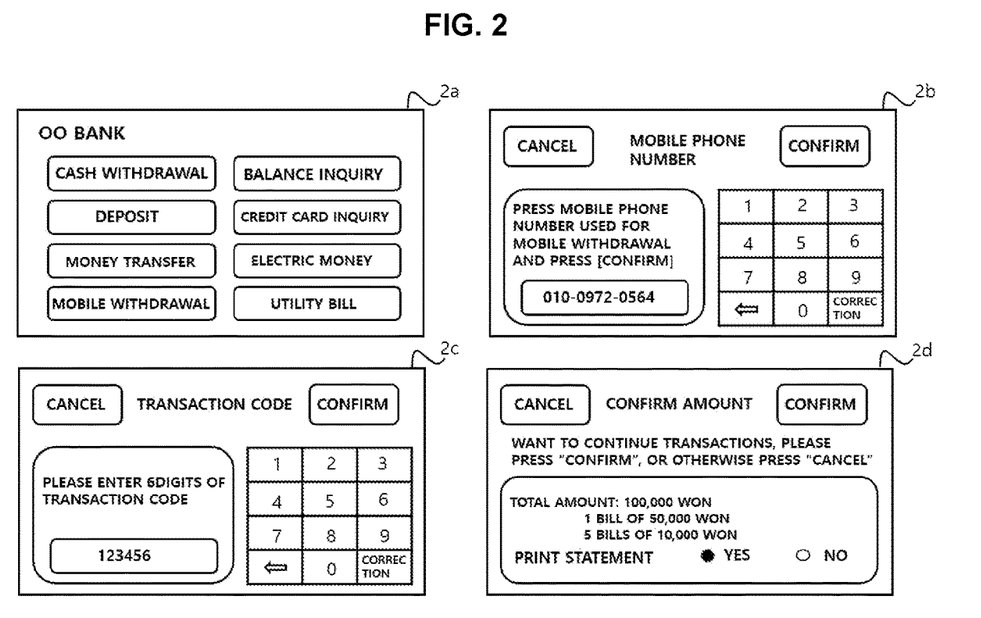
FIG. 2 illustrates a screen of an ATM when a user withdraws cash from an ATM using a smartphone according to an embodiment of the present invention.

In the meantime, FIG. 2 illustrates a screen of the ATM when the user withdraws cash from the ATM using the smartphone.

The user selects the Mobile Withdrawal item (button) from the menu window displayed on the screen of the ATM 32 to withdraw cash from the ATM 32 using the smartphone 31 (2*a*). When the user selects the Mobile Withdrawal item, the ATM 32 displays a window for receiving the user's smartphone number from the user (2*b*).

When the user enters the user's smartphone number into the ATM 32 (2*b*), a transaction code for withdrawing cash is displayed on the smartphone 31 (1*d*). When the user enters the transaction code displayed on the smartphone 31 into the ATM 32 (2*c*) and the user confirms the displayed transaction information for cash withdrawal (2*d*), the cash is withdrawn from the ATM 32.

Figure 3:
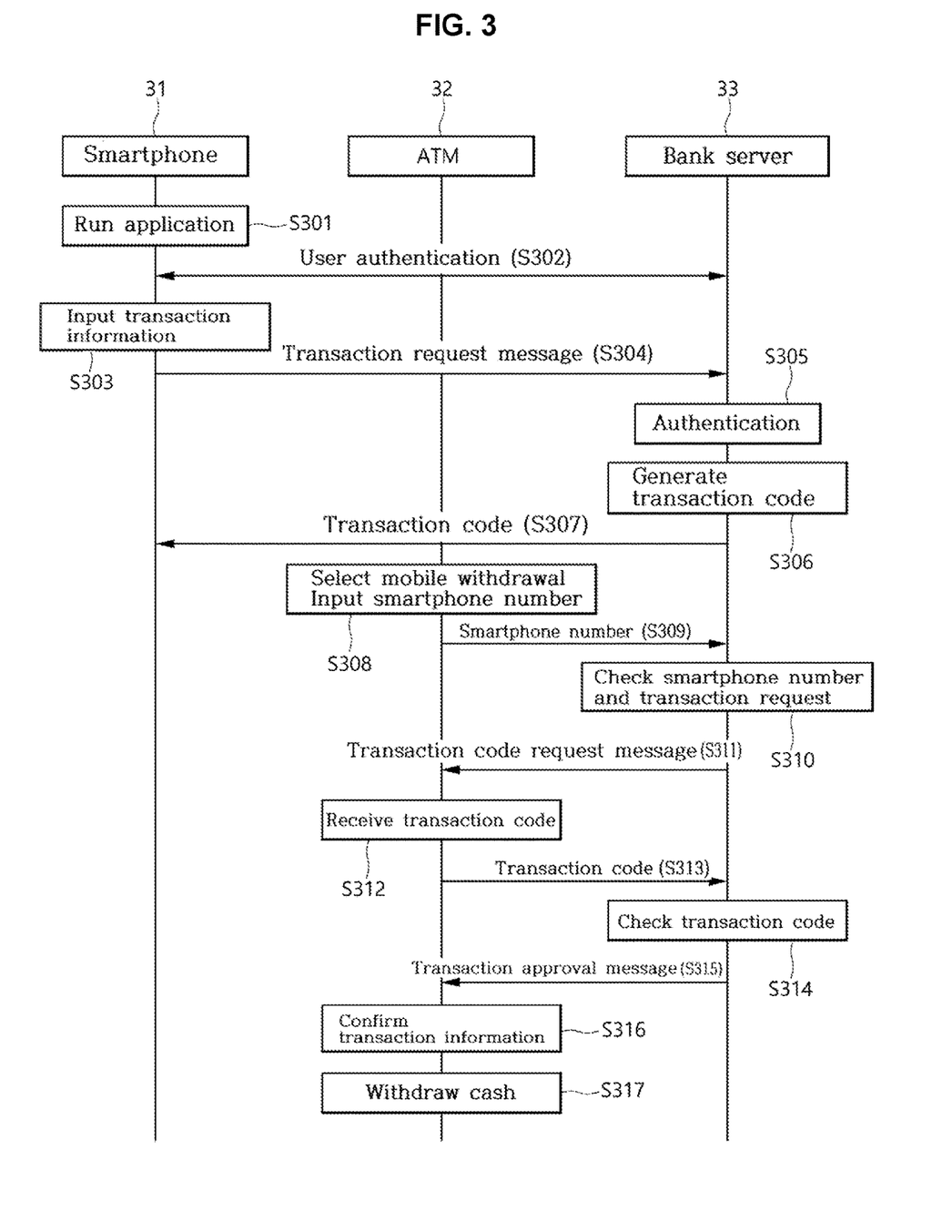
FIG. 3 is a signal processing diagram illustrating a process of withdrawing cash from an ATM using a smartphone, according to the procedures described in FIGS. 1 and 2.

FIG. 3 is a signal processing diagram illustrating a process of withdrawing cash from an ATM 32 using a smartphone 31, according to the procedures described in FIGS. 1 and 2.

Referring to FIG. 3, a user runs a bank application to withdraw cash from the ATM 32 using the smartphone 31 (S301), and the smartphone 31 accesses a bank server 33 to perform user authentication (S302).

The user enters (selects) transaction information for cash withdrawal such as a bank account number, amount of cash to be withdrawn, bill type, and the like into the smartphone 31 by using the bank application (1*b*, S303). Moreover, to enhance security, it is possible for the user to additionally enter an account password for a transaction (1*c*).

The smartphone 31 transmits a transaction request message including the transaction information to the bank server 33 (S304). The bank server 33 authenticates the user and the bank account using the transaction information included in the transaction request message (S305).

When the authentication is completed, the bank server 33 generates a transaction code corresponding to the transaction request message received from the smartphone 31 (S306), and the bank server 33 transmits the transaction code to the smartphone 31 (S307). In this case, it is preferable that the transaction code is generated and transmitted on a one-time basis whenever a transaction request message is received.

When the user selects the Mobile Withdrawal item among various financial transaction items displayed on the ATM 32 (2*a*) and enters the smartphone number (2*b*, S308), the ATM 32 transmits the smartphone number entered by the user to the bank server 33 (S309).

The bank server 33 checks whether the smartphone 31 corresponds to the transaction request message using the received smartphone number (S310). If the smartphone number corresponds to the transaction request message, the bank server 33 transmits a transaction code request message to the ATM 32 (S311).

The user enters the transaction code (1*d*) received from the bank server 33 using the smartphone 31 to the ATM 32 (2*c*, S312), and the ATM 32 transmits the transaction code entered by the user to the bank server 33 (S313).

The bank server 33 checks whether the transaction code received from the ATM 32 is identical to the transaction code previously generated and transmitted by the bank server 33 (S314).

When the check is completed, the bank server 33 transmits a transaction approval message including the transaction information to the ATM 32 (S315).

The user confirms the transaction information such as the withdrawal amount, bill type to be withdrawn, and the like through the screen (2*d*) of the ATM 32 (S316) and the ATM 32 withdraws cash (S317).

Figure 4:
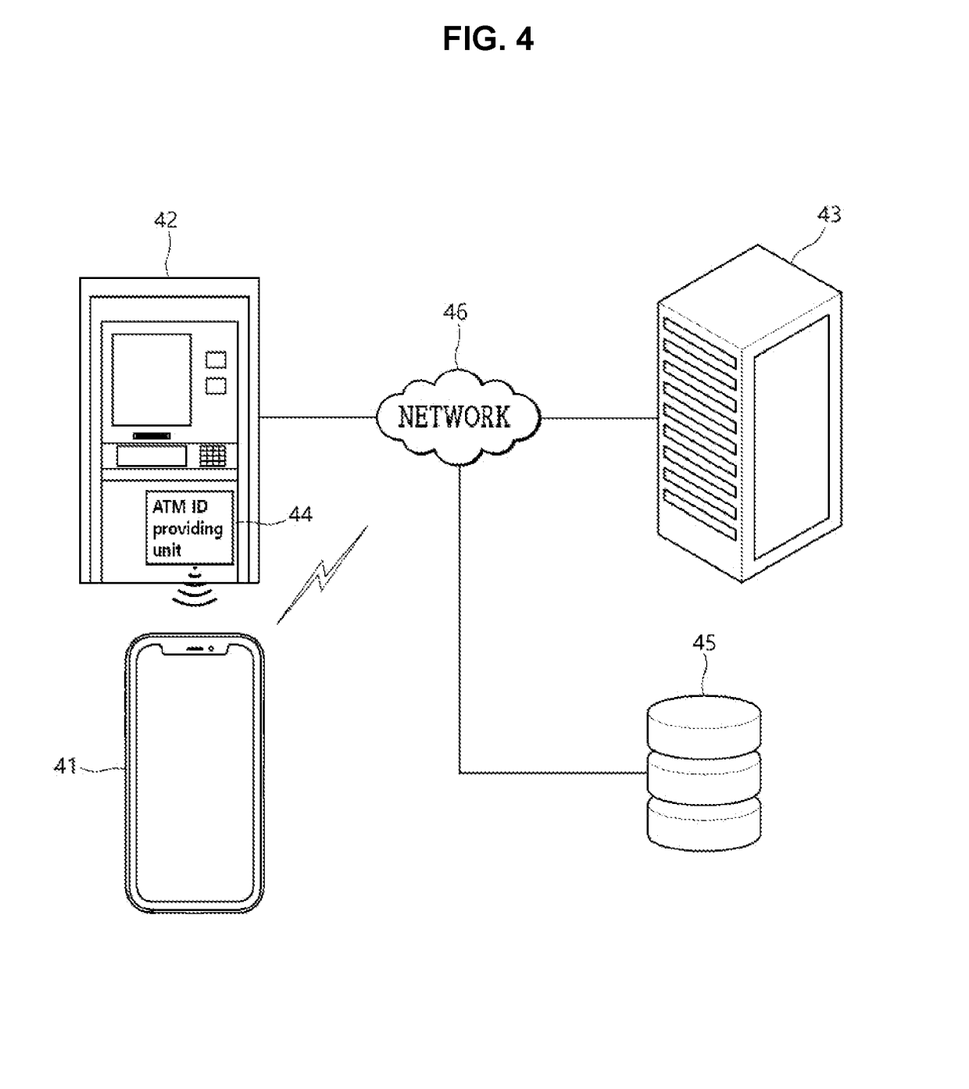
FIG. 4 illustrates a financial transaction system according to an embodiment of the present invention.

FIG. 4 illustrates a financial transaction system according to an embodiment of the present invention.

As illustrated in FIG. 4, the financial transaction system includes a smartphone 41, an ATM 42, a bank server 43, an ATM ID providing unit 44, and an authentication code transfer server 45.

Figure 5:
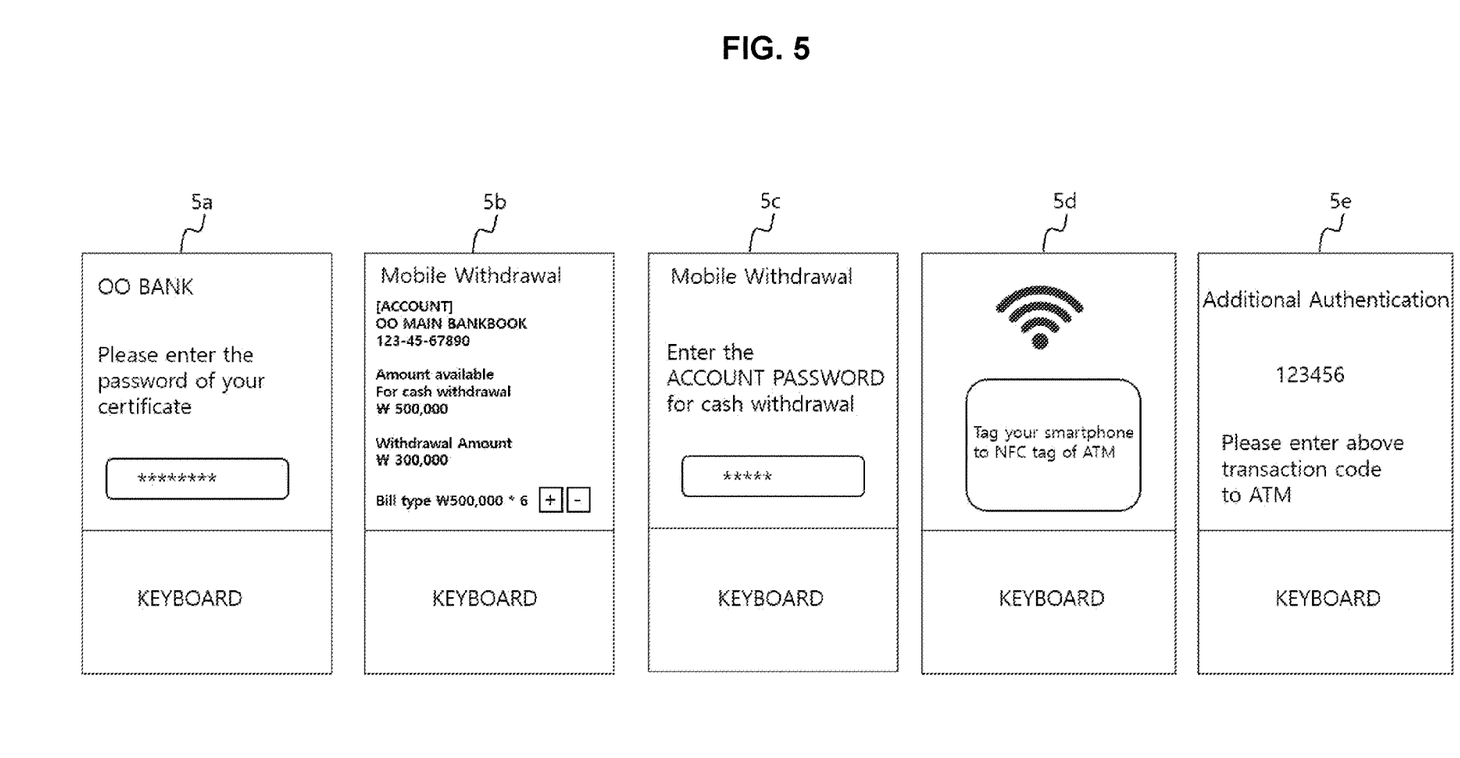
FIG. 5 illustrates a screen of a smartphone when a user withdraws cash using a smartphone from the ATM 42 of the financial transaction system illustrated in FIG. 4.

FIG. 5 illustrates a screen of the smartphone 41 when a user withdraws cash using the smartphone 41 from the ATM 42 of the financial transaction system illustrated in FIG. 4.

Figure 6:
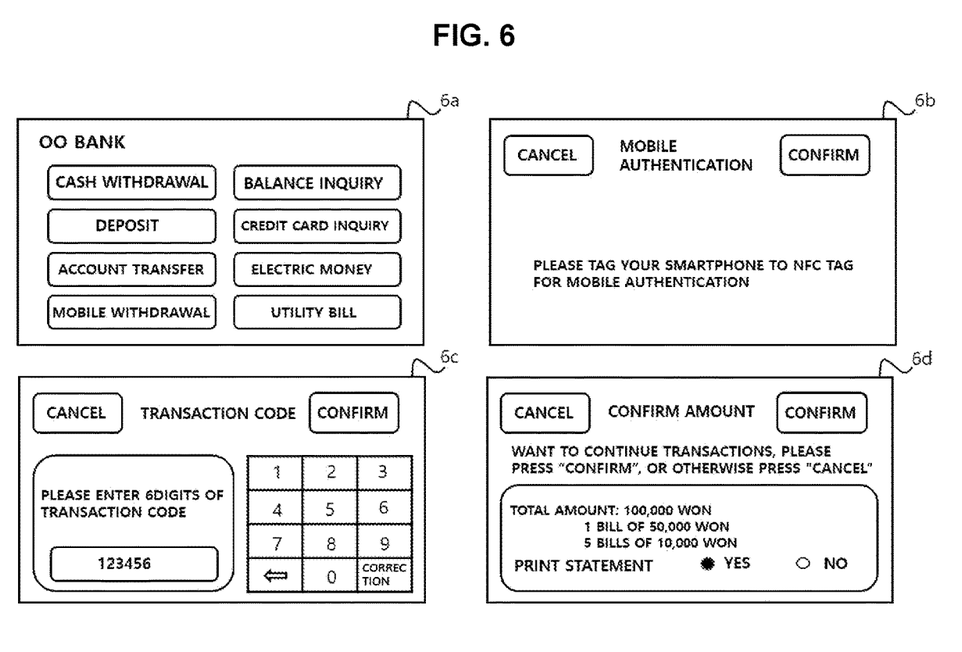
FIG. 6 illustrates a screen of the ATM 42 of the financial transaction system illustrated in FIG. 4 when a user withdraws cash using a smartphone from the ATM.

In the meantime, FIG. 6 illustrates a screen of the ATM 42 when a user withdraws cash using the smartphone 41 from the ATM 42 of the financial transaction system illustrated in FIG. 4.

When a user runs a bank application installed in the smartphone 41 to withdraw cash using his or her smartphone 41, the smartphone 41 displays an authentication window for user authentication. In case of cash withdrawal or money transfer, the smartphone 41 may request an additional authentication through a digital certificate or a Personal Identification Number (PIN) (5*a*).

When the authentication is completed, the user enters (selects) transaction information for a cash withdrawal such as a withdrawal amount, an account number, bill type and the like through the smartphone 41 (5*b*). Moreover, in addition, it is possible for the user to enter the account password for a cash withdrawal before or after the transaction information is entered (5*c*).

In the meantime, the user selects the Mobile Withdrawal item (button) among the various financial transaction items displayed on the screen of ATM 42 to withdraw cash from the ATM 42 using the smartphone 41 (6*a*). When the user selects the Mobile Withdrawal item, the smartphone 41 and the ATM 42 display a window for user authentication for cash withdrawal from ATM 42 (5*d*, 6*b*).

The user authentication is performed through the smartphone 41 by tagging the smartphone 41 to the ATM ID providing unit 44 installed in the ATM 42, according to the guide of the smartphone 41 and/or the ATM 42.

Meanwhile, when there is a need to enhance security, or when the withdrawal amount is more than a specific amount, additional authentication may be performed, and a transaction code for additional authentication may be displayed on the smartphone 41 of the user (5*e*).

When the user enters the transaction code transmitted to the smartphone 41 into the ATM 42 (6*c*), the additional authentication is completed. When the user confirms the transaction information (6*d*), cash is withdrawn from the ATM 42.

Figure 7:
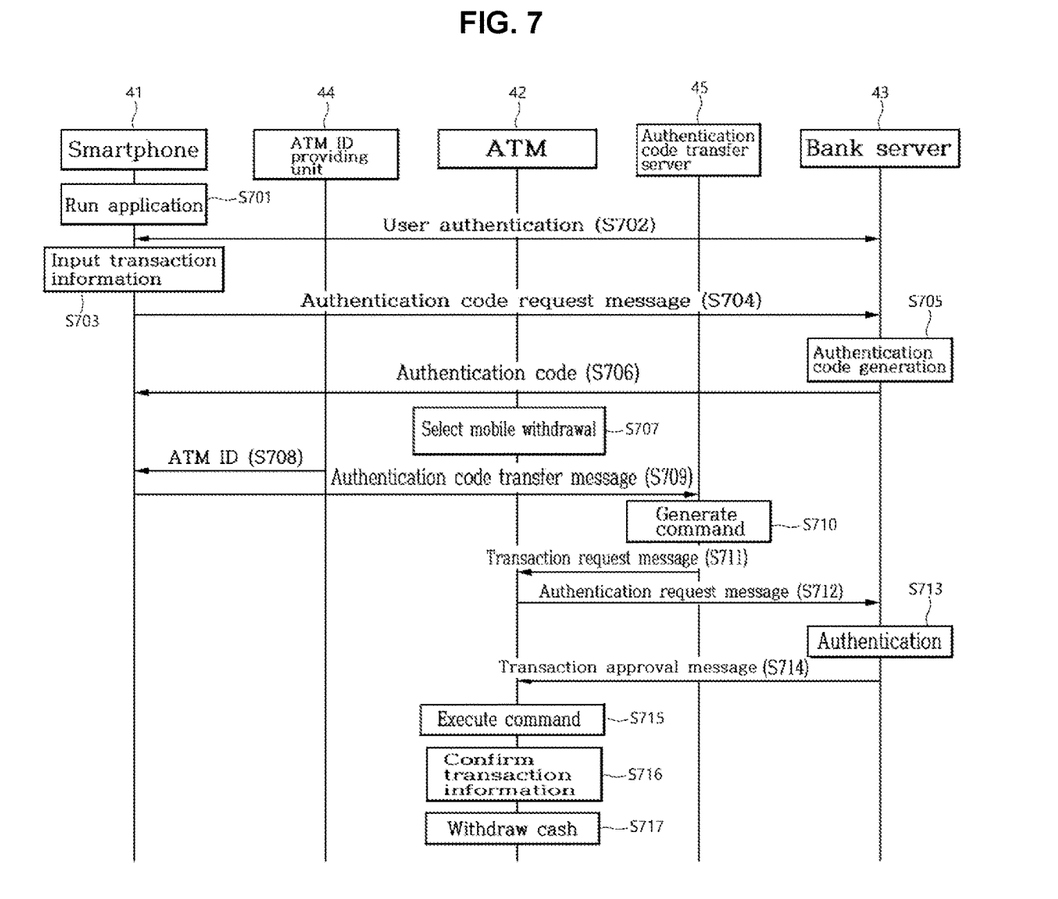
FIG. 7 is a signal processing diagram illustrating a process of withdrawing cash from an ATM using a smartphone, according to the procedure illustrated in FIG. 6.

FIG. 7 is a signal processing diagram illustrating a process of withdrawing cash from an ATM using a smartphone, according to the procedure illustrated in FIG. 5 and FIG. 6.

Referring to FIG. 7, a user runs a bank application to withdraw cash from the ATM 42 using the smartphone 41 (S701), and the smartphone 41 accesses the bank server 43 to perform user authentication (S702).

The user enters transaction information for a cash withdrawal such as a withdrawal amount, bill type, account number, and the like into the smartphone 41 through the bank application (5*b*, S703). Moreover, to enhance security, it is possible for the user to additionally enter an account password (5*c*).

The smartphone 41 transmits an authentication code request message for requesting to generate an authentication code to the bank server 43 (S704), wherein the authentication code request message may include the transaction information and a smartphone number of the smartphone 41. When the bank server 43 receives the authentication code request message, the bank server 43 generates and stores an authentication code corresponding to the smartphone number (S705), and transmits the authentication code to the smartphone 41 (S706).

At this time, it is preferable that the bank server 43 generates and transmits the authentication code on a one-time basis whenever the authentication code request message is received from the smartphone 41.

When the user selects a Mobile Withdrawal item (button) among various financial transaction items (6*a*) displayed on the screen of ATM 42 (S707) and tags the smartphone 41 to the ATM ID providing unit 44 installed in the ATM 42 (5*d*, 6*b*), the smartphone 41 obtains an ATM ID from the ATM ID providing unit 44 (S708). Herein, the ATM ID providing unit 44 may use any scheme as long as the ATM ID providing unit 44 is a device capable of providing the smartphone 41 with the ATM ID. For example, a QR code or barcode can be applied. However, it is most preferable to use Near Field Communication (NFC) for user convenience, and thus an embodiment of the inventive concept is exemplified as a tag method using NFC is applied.

When the smartphone 41 obtains the ATM ID from the ATM ID providing unit 44 (S708), the smartphone 41 transmits a smartphone number, the authentication code received from the bank server 43, and the ATM ID to the authentication code transfer server 45. Herein, the smartphone number, the transaction code, and the ATM ID may be transmitted through an authentication code transfer message (S709). At this time, the transaction information may be transmitted to the authentication code transfer server 45, and it may be included in the authentication code transfer message.

The authentication code transfer server 45 receiving the authentication code transfer message determines to which ATM the authentication code, the phone number, and the transaction information are to be transferred, by referring to the ATM ID included in the authentication code transfer message, and generates commands to be executed in the corresponding ATM (S710). In addition, the authentication code transfer server 45 transmits a transaction request message including the commands to be executed in the ATM 42, the authentication code, the smartphone number, and the transaction information to the ATM (S711). Also, the commands, the authentication code, the smartphone number, and the transaction information may be transmitted to the ATM 42 respectively.

When the ATM 42 receives the transaction request message from the authentication code transfer server 45, the ATM 42 transmits the smartphone number and the authentication code to the bank server 43 (S712). At this time, the smartphone number and the authentication code may be transmitted through an authentication request message. Also, the transaction information may be transmitted through the authentication request message for a banking process. The authentication request message may be transmitted by executing the received commands.

When the bank server 43 receives the smartphone number and the authentication code from the ATM 42, the bank server 43 determines whether the received authentication code matches with the authentication code corresponding to the smartphone number previously generated by the bank server 43 in step S705 (S713).

That is, the bank server 43 performs authentication by determining the authentication code corresponding to the smartphone number matches with the stored authentication code corresponding to the smartphone.

When the bank server 43 authenticates the authentication code and the smartphone number, the bank server 43 transmits a transaction approval message to the ATM 42 (S714).

When the ATM 42 receives the transaction approval message, the ATM 42 executes the commands received through the transaction request message (S715). The commands may be executed by a software agent program installed in the ATM 42. Alternatively, the commands may be executed by a firmware in the ATM 42 or microprocessor installed in the ATM 42 inside.

For example, when the software agent program in the ATM 42 executes the commands, each field of a window on the ATM screen is filled with the transaction information such as a withdrawal amount, bill type, account number and the like, as illustrated in 6*d* of FIG. 6. The user does not need to manually input the transaction information into the ATM 42, because the transaction information is automatically inputted by executing the commands. That is, the user inputs the transaction information into the smartphone 41, instead of inputting the information into the ATM 42, because, as explained above, the transaction information is delivered to the ATM 42 via the authentication code transfer server 45.

When the ATM 42 displays a window 6*d* as illustrated in FIG. 6 showing the transaction (withdrawal) information included in the transaction request message by executing the commands (S715), the user checks each item of the transaction information such as the withdrawal amount and bill type. The user confirms the transaction information shown on the screen of ATM 42 by pressing the confirmation button on the ATM 42 (S716).

When the confirmation is completed, the ATM 42 ejects cash corresponding to the transaction information (S717).

According to the above process, if the user enters the transaction information for cash withdrawal into the smartphone 41 and tags the smartphone 41 into the ATM ID providing unit 44, then the ATM 42 shows the window 6*d* as illustrated in FIG. 6, even without entering the information for cash withdrawal into the ATM 42.

Accordingly, not only security may be enhanced, but also user's convenience may be increased, by skipping the authentication process performed by entering information such as an account number and PIN to the ATM 42.

In the above process, the transaction information for cash withdrawal such as a withdrawal amount, account number, bill type, and the like is displayed on the screen of the ATM 42 by using the smartphone 41, and it is also possible to use the smartphone 41 for the authentication of transaction.

Figure 8:
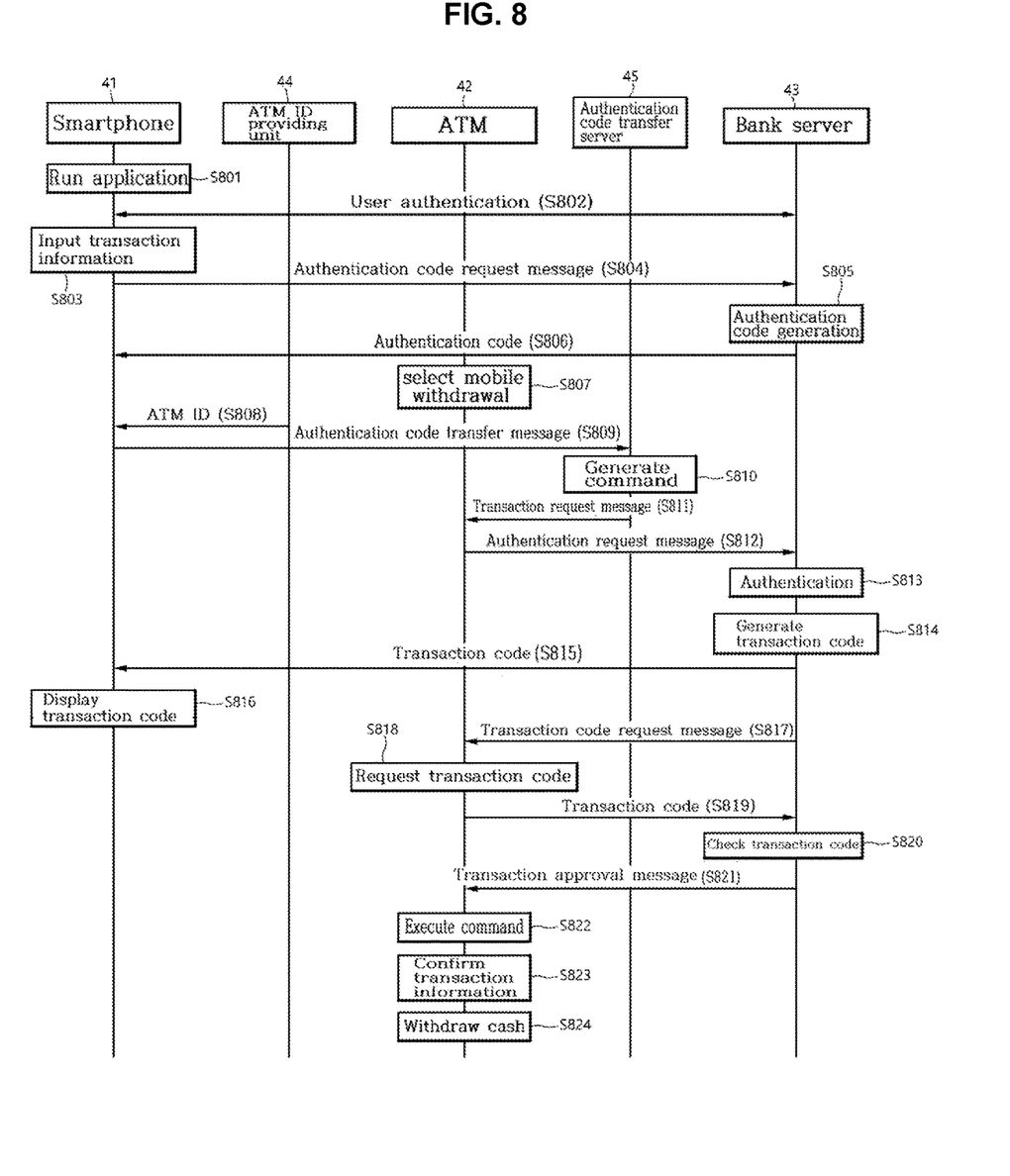
FIG. 8 is a signal processing diagram illustrating a process of withdrawing cash from an ATM using a smartphone, according to the procedure illustrated in FIG. 6.

FIG. 8 is a signal processing diagram illustrating a process of withdrawing cash from the 42 ATM using the smartphone 41, according to the procedure illustrated in FIG. 5 and FIG. 6.

In the embodiment shown in FIG. 7, there is no additional authentication process corresponding to the window 5e of FIG. 5 and the window 6c of FIG. 6. However, in the embodiment shown in FIG. 8, the additional authentication process is included.

Referring to FIG. 8, a user runs a bank application to withdraw cash from the ATM 42 using the smartphone 41 (S801), and the smartphone 41 accesses the bank server 43 to perform user authentication (S802).

The user enters transaction information for cash withdrawal, such as a withdrawal amount, bill type and account number, and the like into the smartphone 41 using the bank application (5b, S803). Moreover, to enhance security, it is possible for the user to additionally enter an account password for a financial transaction (5c).

The smartphone 41 transmits an authentication code request message for requesting to generate an authentication code to the bank server 43 (S804), wherein the authentication code request message may include the transaction information and a smartphone number. Upon receiving the authentication code request message, the bank server 43 generates and stores an authentication code corresponding to the smartphone number (S805) and transmits the authentication code to the smartphone 41 (S806).

At this time, it is preferable that the bank server 43 generates and transmits the authentication code on a one-time basis whenever the authentication code request message is received from the smartphone 41.

When the user selects the Mobile Withdrawal item (button) among various financial transaction items (6a) displayed on the ATM 42 (S807) and tags the smartphone 41 to the ATM ID providing unit 44 installed in the ATM 42 (5d, 6d), the smartphone obtains an ATM ID from the ATM ID providing unit 44 (S808). Herein, the ATM ID providing unit 44 may use any scheme as long as the ATM ID providing unit 44 is a device capable of providing the smartphone 41 with the ATM ID. For example, a QR code or barcode can be applied. However, it is most preferable to use a Near Field Communication (NFC) method for user convenience, and thus an embodiment of the present invention is exemplified as a tag method using NFC is applied.

When the smartphone 41 obtains the ATM ID from the ATM ID providing unit 44 (S808) the smartphone 41 transmits a smartphone number, the authentication code received from the bank server 43, and the ATM ID to the authentication code transfer server 45. Herein, the smartphone number 41, the transaction authentication code, and the ATM ID may be transmitted through an authentication code transfer message (S809). At this time, the transaction information may be transmitted to the authentication code transfer server 45, and it may be included in the transaction authentication code transfer message.

The authentication code transfer server 45 receiving the authentication code transfer message determines to which ATM the authentication code, the phone number, and the transaction information are to be transmitted, by referring to the ATM ID included in the authentication code transfer message, and generates commands to be executed by the corresponding ATM (S810). In addition, the authentication code transfer server 45 transmits a transaction request message including the commands to be executed by the ATM 42, the authentication code, the smartphone number, and the transaction information to the ATM 42 (S811). Also, the commands, the authentication code, the smartphone number, and the transaction information may be transmitted to the ATM 42 respectively.

When the ATM 42 receives the transaction request message from the authentication code transfer server 45, the ATM 42 transmits the smartphone number and the authentication code to the bank server 43 (S812). At this time, the smartphone number and the authentication code may be transmitted through an authentication request message. Also, the transaction information may be transmitted through the authentication request message for a banking process. The authentication request message may be transmitted by executing the received commands.

When the bank server 43 receives the smartphone number and the authentication code from the ATM 42, the bank server 43 determines whether the received authentication code matches with the previously generated authentication code corresponding to the smartphone number by the bank server (S813).

That is, the bank server 43 performs authentication by determining whether the authentication code corresponding to the smartphone number matches with the stored authentication code corresponding to the smartphone 41.

When the bank server 43 authenticates the authentication code and the smartphone number, the bank server 43 generates and stores a transaction code (S814) corresponding to the smartphone 41 and transmits the generated transaction code to the smartphone 41 (S815).

The smartphone 41 receives the transaction code and displays the received transaction code on the window 5e as illustrated FIG. 5 (S816).

When the bank server 43 transmits a transaction code request message to the ATM 42 (S817), the ATM 42 shows a message requesting to enter the transaction code received from the bank server 43 (S818).

The user enters the transaction code displayed on the smartphone 41 to the ATM 42, and the ATM 42 transmits the transaction code to the bank server 43 (S819).

When the bank server 43 receives the transaction code from the ATM 42, the bank server 43 check whether the received transaction code is identical to the stored transaction code corresponding to the smartphone 41 (S820).

If the received transaction code is identical to the stored transaction code corresponding to the smartphone 41, then the bank server 43 transmits a transaction approval message to the ATM 42 (S821).

When the ATM 42 receives the transaction approval message, the ATM 42 executes the commands received through the transaction request message (S822). The commands may be executed by a software agent program installed in the ATM 42. Alternatively, the commands may be executed by a firmware or a microprocessor installed in the ATM 42 inside.

For example, when the software agent program in the ATM 42 executes the commands, by each field of a window on the ATM screen is filled with the transaction information such as a withdrawal amount, bill type, account number and the like, as illustrated in 6d of FIG. 6. The user does not need to manually input the transaction information into the ATM 42, because the transaction information is automatically inputted by executing the commands. That is, the user inputs the transaction information into the smartphone 41, instead of inputting into the ATM 42, because, as explained above, the transaction information is delivered to the ATM 42 via the authentication code transfer server 45.

When the ATM 42 displays a window 6d as illustrated in FIG. 6 according to the transaction (withdrawal) information included in the transaction request message by executing the commands (S822), the user checks each item of the transaction information such as the withdrawal amount and bill type. The user confirms the transaction information shown on the screen of ATM 42 by pressing the confirmation button on the ATM 42 (S823).

When the confirmation is completed, the ATM 42 ejects cash corresponding to the transaction information (S824).

The embodiment shown in FIG. 8 is exemplified as security is enhanced with the transaction code, thereby enabling users and bank to perform more secure financial transactions.

According to the present invention, it is possible to enhance the security of financial transactions, and to increase a user's convenience, by entering information about financial transactions and performing authentication using a smartphone capable of communicating with a financial transaction terminal.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A financial transaction method comprising:
receiving, by a bank server, an authentication code request message from a mobile terminal;
generating, by the bank server, an authentication code in response to the request message and transmitting the authentication code to the mobile terminal;
providing, by an ATM ID providing unit, an ATM identifier (ID) to the mobile terminal;
receiving, by an authentication code transfer server, an authentication code transfer message from the mobile terminal, the authentication code transfer message including the authentication code, the ATM ID, and transaction information entered by a user using the mobile terminal;
generating, by the authentication code transfer server, commands to be executed by an ATM identified by the ATM ID when the authentication code transfer message is received from the mobile terminal;
transmitting, by the authentication code transfer server, a transaction request message to the ATM identified by the ATM ID, the transaction request message including the authentication code, the transaction information, and the commands;
transmitting, by the ATM, an authentication request message including the authentication code to the bank server;
performing, by the bank server, transaction authentication by comparing the authentication code received from the ATM with the authentication code previously generated by the bank server, and transmitting a transaction approval message to the ATM when the transaction authentication is confirmed;
executing, by the ATM, the commands received from the authentication code transfer server and displaying the transaction information on a screen for user confirmation; and
dispensing, by the ATM, cash according to the transaction information received from the authentication code transfer server upon receiving the transaction approval message from the bank server.

2. The method of claim 1, wherein the authentication code request message includes the transaction information entered by the user and a phone number of the mobile terminal.

3. The method of claim 1, wherein the transaction information includes a withdrawal amount and an account number of a bank account subject to a cash withdrawal.

4. The method of claim 1, wherein the ATM ID providing unit is a Near Field Communication (NFC) Tag, and the ATM ID providing unit provides the ATM ID when the user tags the mobile terminal to the ATM ID providing unit.

5. The method of claim 1, wherein the authentication code transfer message further includes a phone number of the mobile terminal and the ATM ID.

6. The method of claim 1, wherein the transaction request message further includes a phone number of the mobile terminal.

7. The method of claim 1, wherein the commands are executed by a software agent program installed in the ATM.

8. The method of claim 1, wherein the commands are executed by a firmware or microprocessor installed in the ATM.

9. A financial transaction system comprising:
a bank server configured to receive an authentication code request message from a mobile terminal, generate an authentication code in response to the request message, and transmit the authentication code to the mobile terminal;
an ATM ID providing unit configured to provide an ATM identifier (ID) to the mobile terminal;
an authentication code transfer server configured to receive an authentication code transfer message from the mobile terminal, the authentication code transfer message including the authentication code, the ATM ID, and transaction information entered by a user using the mobile terminal; and
an ATM configured to receive a transaction request message including the authentication code and the transaction information from the authentication code transfer server, and transmit an authentication request message including the authentication code to the bank server,
wherein the bank server is further configured to perform transaction authentication by comparing the authentication code received from the ATM with the authentication code previously generated by the bank server and to transmit a transaction approval message to the ATM when the transaction authentication is confirmed,
wherein the ATM is further configured to dispense cash according to the transaction information received from the authentication code transfer server upon receiving the transaction approval message from the bank server,
wherein the authentication code transfer server is further configured to generate commands to be executed by the ATM when the authentication code transfer message is received from the mobile terminal,
wherein the ATM is further configured to execute the commands received from the authentication code transfer server and displays the transaction information on a screen for user confirmation.

10. The system of claim 9, wherein the authentication code request message includes the transaction information entered by the user and a phone number of the mobile terminal.

11. The system of claim 9, wherein the transaction information includes a withdrawal amount and an account number of a bank account subject to a cash withdrawal.

12. The system of claim 9, wherein the ATM ID providing unit is a Near Field Communication (NFC) tag, and the ATM ID providing unit is configured to provide the ATM ID when the user tags the mobile terminal to the ATM ID providing unit.

13. The system of claim 9, wherein the authentication code transfer message further includes a phone number of the mobile terminal and the ATM ID.

14. The system of claim 9, wherein the transaction request message further includes a phone number of the mobile terminal.

15. The system of claim 9, wherein the ATM comprises a software agent program configured to execute the commands received from the authentication code transfer server.

16. The system of claim 9, wherein the ATM comprises a firmware or microprocessor configured to execute the commands received from the authentication code transfer server.

* * * * *